(12) United States Patent
Zhang et al.

(10) Patent No.: US 8,259,174 B2
(45) Date of Patent: Sep. 4, 2012

(54) CAMERA AUTO-CALIBRATION BY HORIZON ESTIMATION

(75) Inventors: Wende Zhang, Shelby Township, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 753 days.

(21) Appl. No.: 12/367,305

(22) Filed: Feb. 6, 2009

(65) Prior Publication Data
US 2010/0201814 A1 Aug. 12, 2010

(51) Int. Cl.
 *H04N 7/18* (2006.01)
 *H04N 5/228* (2006.01)
 *G06K 9/00* (2006.01)
(52) U.S. Cl. ............... 348/148; 348/208.15; 382/106
(58) Field of Classification Search ............... 348/148
See application file for complete search history.

(56) References Cited

U.S. PATENT DOCUMENTS
7,253,835 B2 * 8/2007 Chen .................. 348/208.15

OTHER PUBLICATIONS

Zhang, W. and Naik, S.M., U.S. Patent Application entitled Camera-Based Lane Marker Detection, U.S. Appl. No. 12/175,631, filed Jul. 18, 2008.

* cited by examiner

*Primary Examiner* — Peling Shaw
*Assistant Examiner* — Joiya M Cloud
(74) *Attorney, Agent, or Firm* — John A. Miller; Miller IP Group, PLC

(57) ABSTRACT

A method for estimating the horizon in an image of a camera to provide camera auto-calibration in the pitch direction. The method includes taking an image of a scene and generating a texture map of the image using horizontal edge detection analysis to locate horizontal edges in the scene. The method also includes providing a motion map by providing image differencing between subsequent images to find areas in the scene with no motion while the vehicle is moving. The texture map and the motion map are combined to identify the areas in the image that do not move and contain horizontal edges. A horizontal projection is generated from the combined map by counting white dots in the map in the horizontal direction. The horizontal projection is smoothed to eliminate noise and the location of the horizon is estimated in the image by identifying the maximum peak in the horizontal projection.

20 Claims, 2 Drawing Sheets

CAMERA AUTO-CALIBRATION BY HORIZON ESTIMATION

BACKGROUND OF THE INVENTION

1. Field of the Invention

This invention relates generally to a system and method for providing an estimation of the horizon in an image from a camera and, more particularly, to a system and method for providing an estimation of the horizon in an image from a camera for calibrating the camera in the pitch direction.

2. Discussion of the Related Art

Modern vehicles sometimes include one or more camera's that provide back-up assistance, take images of the vehicle driver to determining driver drowsiness or attentiveness, provide images of the road as the vehicle is traveling for collision avoidance purposes, provide structure recognition, such as roadway signs, etc. For those applications where graphics are overlaid on the camera images, it is critical to accurately calibrate the position and orientation of the camera with respect to the vehicle. Because of manufacturing tolerances, a separate end-of-line camera calibration, or aftermarket camera adjustment, must be performed on each vehicle for such things as accurate overlay of predicted vehicle path lines.

Some known camera systems do not provide camera calibration, but revert to a default value that may provide a couple of degrees of error. Other camera systems provide a pre-calibration approach where points on the camera image are hand-labeled and feature point locations are hand measured in the vehicle coordinates, such as by providing a checker board pattern of the image. However, these calibration techniques are typically time consuming and must be performed at a service location. Therefore, if the vehicle is traveling and hits a bump or some other obstacle in the road, the camera position could be altered, where the calibration would not be accurate until the vehicle was taken to the service location to be corrected.

Camera calibration involves determining a set of parameters that relate camera image coordinates to world coordinates and vice versa. Some camera parameters, such as camera focal length, optical center, etc., are stable, while other parameters, such as camera orientation and position, are not. For example, the height of the camera depends on the load of the vehicle, which will change from time to time. This change can cause overlaid graphics of vehicle trajectory on the camera image to be inaccurate. Therefore, what is needed is a camera calibration process that automatically calibrates less stable camera parameters as the vehicle is being driven where the vehicle-camera system continually adapts itself over time.

Estimating the horizon in the camera images provides one technique by which a camera image can be calibrated, particularly in the pitch direction. However, known camera calibration techniques that rely on horizon estimation are typically inaccurate and unreliable.

SUMMARY OF THE INVENTION

In accordance with the teachings of the present invention, a system and method are disclosed for estimating the horizon in an image of a camera to provide camera auto-calibration in the pitch direction. The method includes taking an image of a scene and generating a texture map of the image using horizontal edge detection analysis to locate horizontal edges in the scene. The method also includes providing a motion map by providing image differencing between subsequent images to find areas in the scene with no motion while the vehicle is moving. The texture map and the motion map are combined to identify the candidate areas in the image that do not move and contain horizontal edges. A horizontal projection is generated from the combined map by counting white dots in the candidate area in the map in the horizontal direction. The horizontal projection is smoothed to eliminate noise and the location of the horizon is estimated in the image by identifying the maximum peak in the horizontal projection. The estimated horizon can then be used in the auto-calibration process to calibrate the camera.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing an estimation of the horizon in an image from a camera for camera auto-calibration in the pitch direction is merely exemplary in nature, and is in no way intended to limit the invention or its applications or uses. For example, the present invention has particular application for calibrating a vehicle camera. However, as will be appreciated by those skilled in the art, the present invention will have application for cameras other than vehicle cameras.

Figure 1:
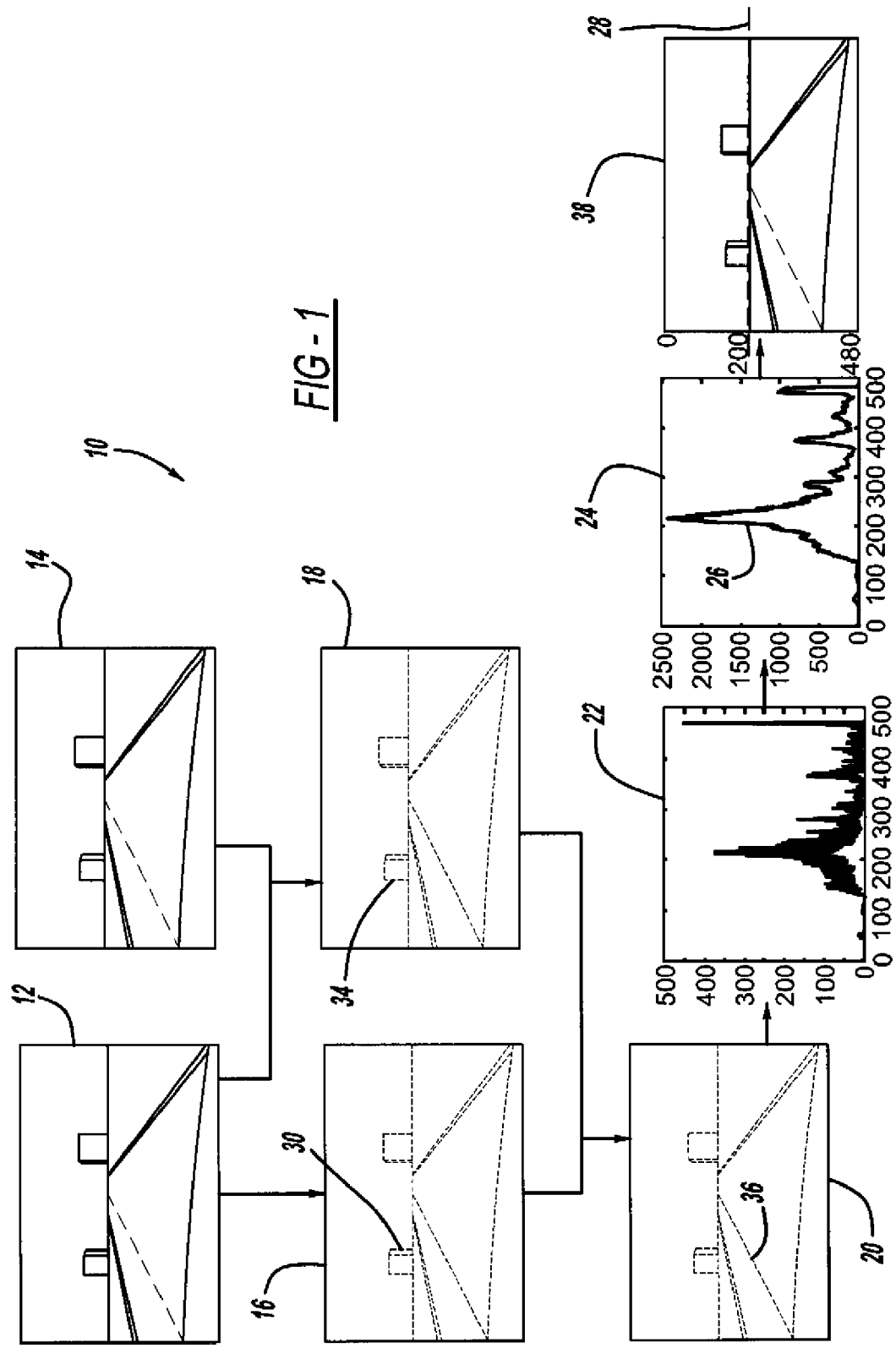
FIG. 1 is a flow chart diagram showing a process for providing camera image horizon estimation.

FIG. 1 is a flow chart diagram 10 showing a method for estimating a horizon in an image of a camera. A camera image 12 is shown at time k and a camera image 14 is shown at time k+1 of a road in front of a vehicle. As will be discussed below, the method estimates the horizon in the images 12 and 14, which is basically a line that contains many horizontal edges where the sky and road intersect. The horizon is basically the same from one image to the next image so that this value can be used to calibrate the camera in the pitch direction. A next step in the method is to generate a texture map 16 using horizontal structural analysis to provide horizontal edge detection. The horizontal edge detection can use any suitable filtering process, such as Sobel filtering, to identify horizontal edges in the image 12. Particularly, if a horizontal edge response in the image 12 exceeds some threshold that defines a horizontal edge, then that position is identified with a white dot 30 where the combination of white dots form the texture map 16.

The two images 12 and 14 are combined using a motion analysis process to find areas in the images 12 and 14 where not much motion occurs while the vehicle is moving. From the analysis, the images 12 and 14 are subtracted from each other or differenced and those areas or pixels that do not exceed some threshold are not moving and are also identified by white dots 34, as shown by a motion map 18. The horizon should not move in the images 12 and 14 because it is far away. The next step in the horizon estimation process is to combine the texture map 16 and the motion map 18 into a combined map 20 to find the areas in the maps 16 and 18 that do not move and contain horizontal edges.

The next step to is to count the white dots 36 in the combined map 20 in the horizontal direction to provide a horizontal projection and identify where the horizon is in the combined map 20. This step is represented by a graph 22 as a horizontal histogram and showing the location along the vertical side of the combined map 20 and the number of counted white dots 36 on the horizontal axis. The major spike around 200 identifies the estimated horizon. This horizontal projection includes a lot of noise that can be smoothed out using a suitable smoothing filter, such as a Gaussian filter, to get a smooth horizontal projection as shown in graph 24. A maximum peak 26 in the graph 24 identifies the estimated horizon at line 28 in the image 38.

Figure 2:
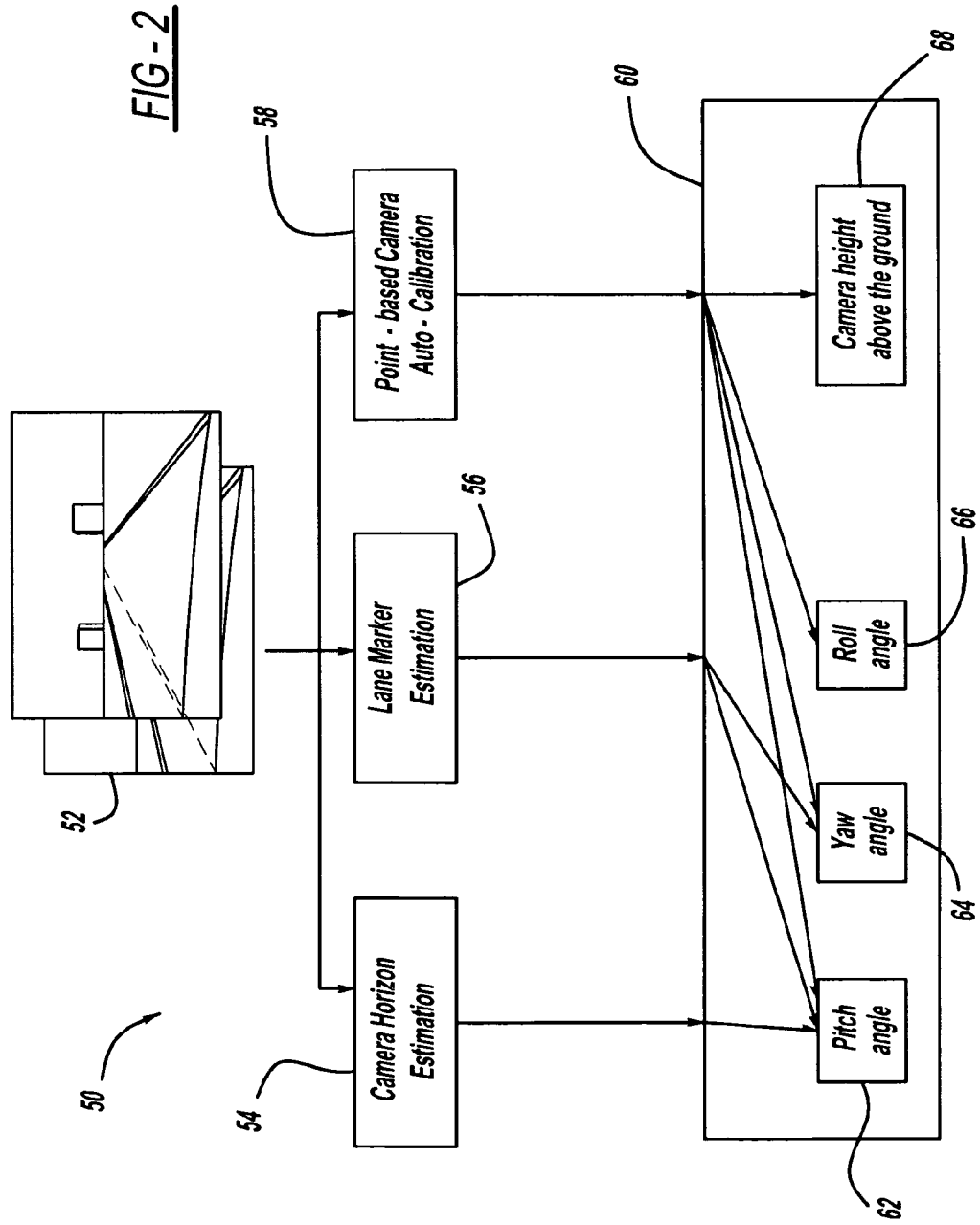
FIG. 2 is a block diagram showing a system for providing camera auto-calibration using the horizon estimation.

FIG. 2 is a flow chart diagram 50 showing a process for providing camera auto-calibration that employs horizon estimation based on the process discussed above. Images are generated at box 52. These images are made available to box 54 that provides camera horizon estimation by the process discussed above. Additionally, the images can be provided to box 56 that provides lane marker estimation to determine the vanishing point in the distance, such as disclosed in U.S. patent application Ser. No. 12/175,631, filed Jul. 18, 2008, titles "Camera-Based Lane Marker Detection", assigned to the assignee of this application and herein incorporated by reference. The images can also be provided to a point-based camera auto-calibration box 58 that provides camera auto-calibration, such as disclosed in U.S. patent application Ser. No. 12/125,471, filed May 22, 2008, titled "Self Calibration of Camera Parameters for a Vehicle Camera", assigned to assignee of this application and herein incorporated by reference.

Using the camera horizon estimation, the lane marker estimation and the point-based camera auto-calibration, the camera orientation can be automatically updated at box 60. The camera horizon estimation can update the cameras pitch angle at box 62 and the lane marker estimation can update the cameras pitch angle at the box 62 and the cameras yaw angle at box 64. The point-based auto-calibration can be used to update all of the cameras pitch angle at the box 62, the cameras yaw angle at the box 64, the cameras roll angle at box 66 and the cameras height above ground at box 68.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating a horizon on an image from a camera, said method comprising:
    providing first and second images from the camera;
    providing a texture map from one of the images that locates horizontal edges in the image;
    providing a motion map from a difference between the first and second images that locates areas in the images where no motion is occurring;
    combining the texture map and the motion map to identify locations in the combined map that include a horizontal edge and do not move;
    providing a horizontal projection that includes a count of identified locations in the horizontal direction in the combined map that included horizontal edges and do not move; and
    identifying a maximum peak in the horizontal projection that identifies the estimated horizon in the images.

2. The method according to claim 1 further providing a smoothing of the horizontal projection to reduce noise in the horizontal projection.

3. The method according to claim 1 wherein providing a texture mg includes using horizontal edge detection analysis that includes using Sobel filtering.

4. The method according to claim 1 wherein the edges in the texture map, the locations in the combined map and the locations in the horizontal projection are dots.

5. The method according to claim 2 wherein smoothing the horizontal projection includes using a Gaussian smoothing filter.

6. The method according to claim 1 wherein the horizontal projection is a horizontal histogram.

7. The method according to claim 1 wherein the camera is a vehicle camera.

8. The method according to claim 1 further comprising using the horizon estimation to update the camera's pitch angle.

9. A method for estimating a horizon in an image from a camera, said method comprising:
    providing first and second images from the camera;
    providing a texture map from one of the images that locates horizontal edges in the image as dots where providing the texture map includes using a horizontal edge detection analysis to locate the horizontal edges;
    providing a motion map from a difference between the first and second images that locates areas in the images as dots where no motion is occurring;
    combining the texture map and the motion map to identify locations in the combined map as dots that include a horizontal edge and do not move;
    providing a horizontal projection that includes a count in the horizontal direction of the white dots in the combined map that include horizontal edges and do not move in the combined map; and
    identifying a maximum peak in the horizontal projection that identifies the estimated horizon in the images.

10. The method according to claim 9 wherein providing horizontal edge detection analysis includes using Sobel filtering.

11. The method according to claim 9 further comprising smoothing the horizontal projection to reduce noise in the horizontal projection.

12. The method according to claim 9 wherein the horizontal projection is a horizontal histogram.

13. The method according to claim 9 wherein the camera is a vehicle camera.

14. The method according to claim 9 further comprising using the horizon estimation to update the camera's pitch angle.

15. A system for estimating a horizon in an image from a camera, said method comprising:
    means for providing first and second images from the camera;
    means for providing a texture map from one of the images that locates horizontal edges in the image as dots;
    means for providing a motion map from a difference between the first and second images that locates areas in the images as dots where no motion is occurring;
    means for combining the texture map and the motion map to identify locations in the combined map as dots that include a horizontal edge and do not move;
    means for providing a horizontal projection that includes a count of the dots in the horizontal direction in the combined map that includes a horizontal edge and do not move; and
    means for identifying a maximum peak in the horizontal projection that identifies the estimated horizon in the images.

16. The system according to claim 15 wherein the means for providing a texture map uses Sobel filtering.

17. The system according to claim 15 further comprising means for smoothing the horizontal projection to reduce noise in the horizontal projection.

18. The system according to claim 15 wherein the horizontal projection is a horizontal histogram.

19. The system according to claim 15 wherein the camera is a vehicle camera.

20. The system according to claim 15 further comprising means for using the horizon estimation to update the camera's pitch angle.

\* \* \* \* \*